(12) United States Patent
Matsushita et al.

(10) Patent No.: US 7,500,545 B2
(45) Date of Patent: Mar. 10, 2009

(54) RESERVOIR APPARATUS FOR A BICYCLE BRAKE LEVER DEVICE

(75) Inventors: Tatsuya Matsushita, Sakai (JP); Osamu Kariyama, Sakai (JP); Shinichi Takizawa, Izumisano (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 0 days.

(21) Appl. No.: 11/164,996

(22) Filed: Dec. 13, 2005

(65) Prior Publication Data
US 2007/0131495 A1 Jun. 14, 2007

(51) Int. Cl.
*B62L 3/00* (2006.01)

(52) U.S. Cl. .............. 188/24.22; 188/344; 188/24.11; 60/547.1; 60/562; 92/142

(58) Field of Classification Search .............. 188/24.22; 60/477, 547.1, 562; 92/142
See application file for complete search history.

(56) References Cited

U.S. PATENT DOCUMENTS

| | | | |
|---|---|---|---|
| 4,501,340 A * | 2/1985 | Yoshida | 180/219 |
| 4,560,049 A * | 12/1985 | Uchibaba et al. | 192/85 R |
| 4,626,045 A * | 12/1986 | Takei et al. | 303/119.3 |
| 4,635,442 A * | 1/1987 | Bass | 60/594 |
| 4,694,938 A * | 9/1987 | Hayashi et al. | 188/181 A |
| 4,771,649 A * | 9/1988 | Modolo | 74/489 |
| 4,779,482 A * | 10/1988 | Kawaguchi | 74/523 |
| 4,838,113 A * | 6/1989 | Matsushima et al. | 74/551.8 |
| 4,840,082 A * | 6/1989 | Terashima et al. | 74/523 |
| RE33,578 E * | 4/1991 | Bass | 60/594 |
| 5,632,362 A * | 5/1997 | Leitner | 188/344 |
| 6,209,687 B1* | 4/2001 | Hundley | 188/24.16 |
| 6,336,327 B1* | 1/2002 | Noro et al. | 60/533 |
| 6,804,961 B2* | 10/2004 | Lumpkin | 60/588 |
| 6,871,729 B2* | 3/2005 | Huster et al. | 188/24.11 |
| 6,883,647 B1* | 4/2005 | Wen | 188/24.22 |
| 7,100,751 B2* | 9/2006 | Lavezzi | 188/344 |
| 7,137,492 B2* | 11/2006 | Laghi | 188/344 |

(Continued)

FOREIGN PATENT DOCUMENTS

DE 20309131 U1 9/2003

(Continued)

OTHER PUBLICATIONS

European Search Report for EP 0602369.2, the European equivalent of this application, dated Oct. 11, 2007.

*Primary Examiner*—Robert A Siconolfi
*Assistant Examiner*—Mariano Sy
(74) *Attorney, Agent, or Firm*—James A. Deland

(57) ABSTRACT

A reservoir apparatus for a bicycle brake lever device comprises a master cylinder and a fluid reservoir including first and second reservoirs. The master cylinder has a master cylinder chamber dimensioned for receiving a master cylinder piston therein. The first reservoir has a first reservoir chamber in fluid communication with the master cylinder chamber for supplying a hydraulic fluid to the master cylinder chamber. At least a portion of the first reservoir chamber is disposed below a portion of the master cylinder chamber. The second reservoir has a second reservoir chamber in fluid communication with the first reservoir chamber, wherein the second reservoir chamber includes an air entrainment surface. The air entrainment surface is positioned higher than an upper surface of the first reservoir chamber.

5 Claims, 2 Drawing Sheets

U.S. PATENT DOCUMENTS

| | | | |
|---|---|---|---|
| 2002/0070084 A1* | 6/2002 | Chou | 188/24.11 |
| 2003/0121262 A1 | 7/2003 | Lumpkin | |
| 2003/0213666 A1* | 11/2003 | Masuda et al. | 188/344 |
| 2004/0055840 A1* | 3/2004 | Lumpkin | 188/344 |
| 2004/0163897 A1* | 8/2004 | Becocci et al. | 188/24.22 |
| 2005/0056508 A1* | 3/2005 | Laghi | 188/344 |
| 2005/0061590 A1 | 3/2005 | Lumpkin | 188/151 R |

FOREIGN PATENT DOCUMENTS

| | | |
|---|---|---|
| EP | 252701 A2 | 1/1988 |
| GB | 977809 A | 12/1964 |
| WO | 2005087574 A1 | 9/2005 |

\* cited by examiner

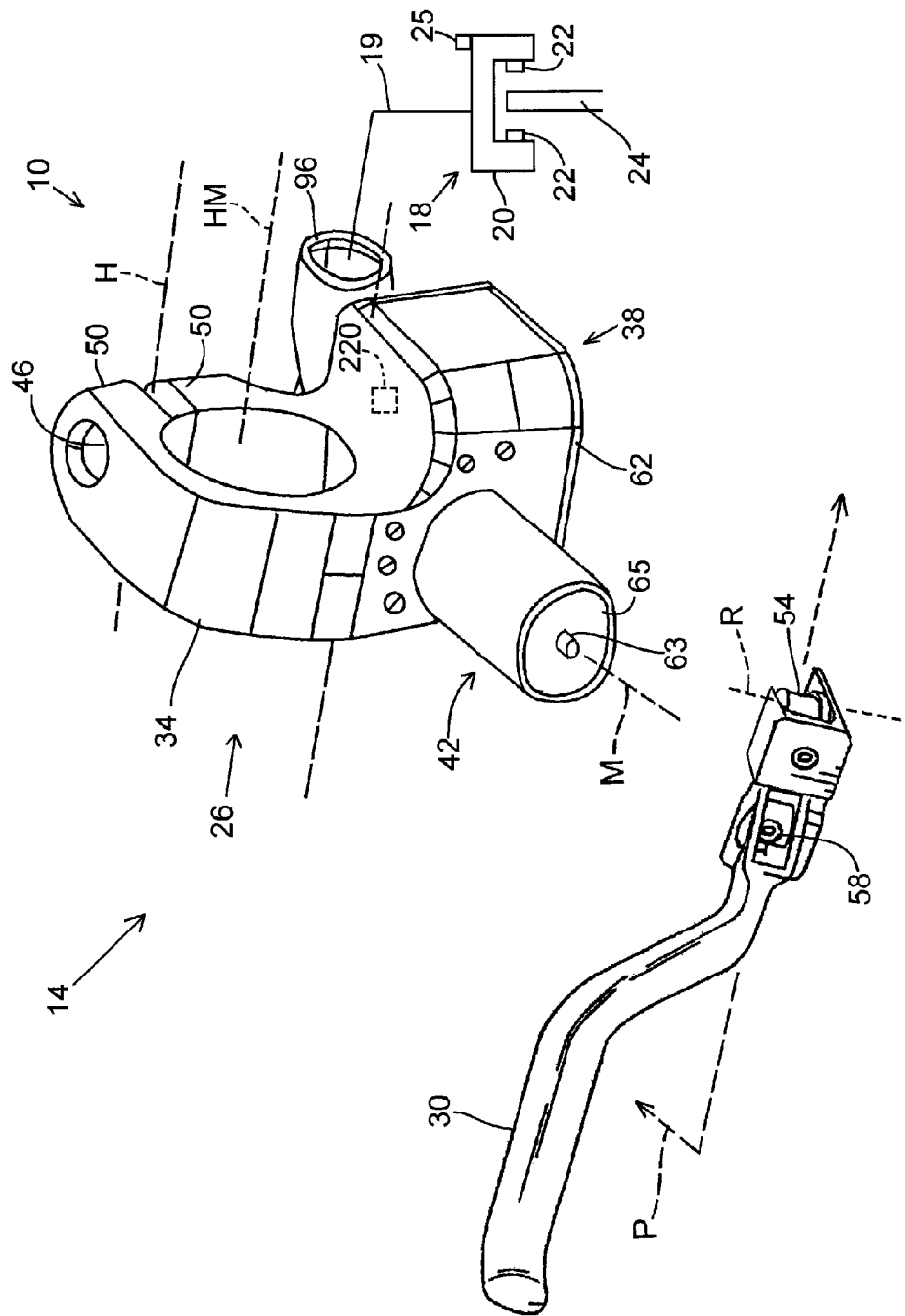

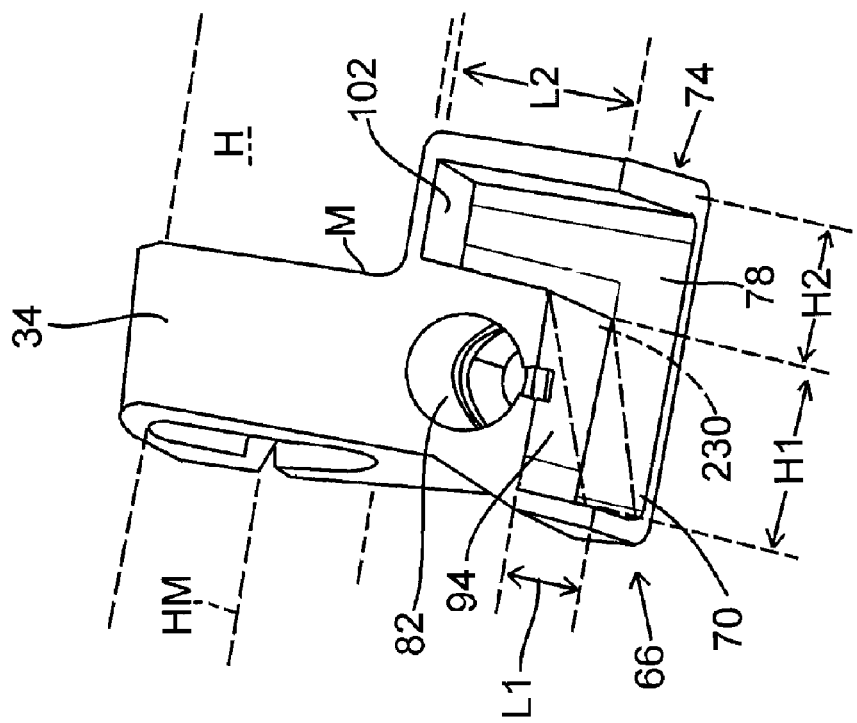
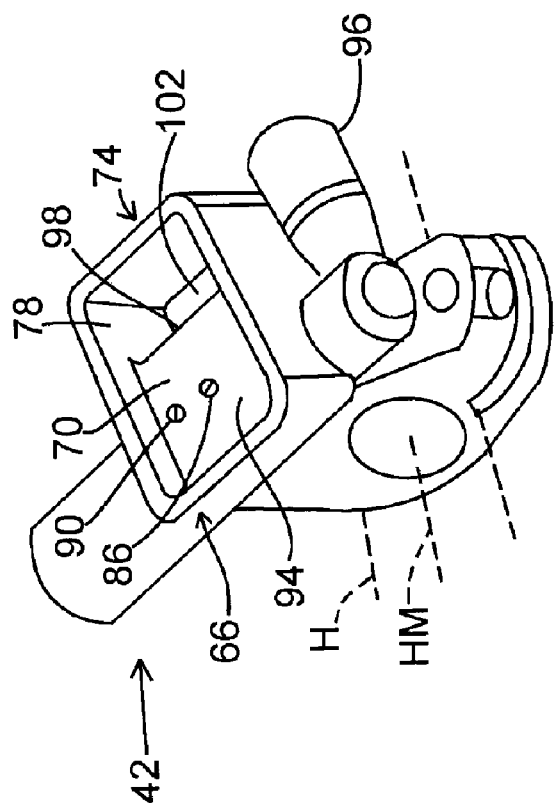
Fig. 3
Fig. 2

RESERVOIR APPARATUS FOR A BICYCLE BRAKE LEVER DEVICE

BACKGROUND OF THE INVENTION

The present invention is directed to bicycles and, more particularly, to a hydraulic apparatus for a bicycle brake lever device.

In recent years, some high performance bicycles have been equipped with hydraulic disk brake systems. Hydraulic disk brake systems typically include a caliper housing, first and second brake pads mounted on opposite inner sides of the caliper housing so as to face each other, and one or more pistons that move the first and/or second brake pads towards each other in response to hydraulic pressure created by the actuation of a brake lever assembly mounted to the bicycle handlebar. A rotor that rotates with the bicycle wheel is disposed between the first and second brake pads. The first and second brake pads apply a frictional force to the rotor when they move towards each other in response to the hydraulic pressure created by the actuation of the brake lever assembly, thereby stopping rotation of the rotor and the bicycle wheel.

The brake lever assembly typically comprises a base member structured to attach to the bicycle handlebar and a brake lever pivotably coupled to the base member. The base member includes or is attached to a master cylinder and a fluid reservoir that supplies brake fluid to the master cylinder through appropriate orifices. The fluid reservoir has a removable cap so that brake fluid may be added as necessary. The master cylinder includes a brake fluid outlet and a piston that reciprocates in response to pivoting of the brake lever. A tube is connected between the brake fluid outlet and the caliper housing to communicate brake fluid between the master cylinder and the caliper housing. Pivoting the brake lever toward the handlebar causes the brake lever to press against the piston so that the piston forces brake fluid through the brake fluid outlet to the caliper housing, thereby causing the first and second brake pads to contact the rotor.

Brake fluid is a substantially compressionless fluid that allows the brake fluid to properly communicate the force from the piston in the brake lever assembly to the piston(s) in the caliper housing. Accordingly, it is necessary to ensure that there is no air, which is highly compressible, in the path from the piston in the brake lever assembly to the piston(s) in the caliper. Conventionally, this is accomplished by installing a bleeder screw at the fluid reservoir in the caliper housing. The bleeder screw typically has a solid inner end and an internal fluid passage that extends from a side of the screw near the inner end to the outer end of the screw. When the bleeder screw is screwed into the caliper housing, the solid inner end closes an orifice at the fluid reservoir. Loosening the bleeder screw allows brake fluid to move past the solid inner end, through the internal fluid passage and out of the outer end of the screw. Thus, by loosening the bleeder screw and operating the brake lever, fluid is forced from the reservoir in the brake lever assembly, through the tubing connecting the master cylinder to the caliper housing, and through the bleeder screw. Any air in the path from the master cylinder to the caliper housing exits through the bleeder screw together with any air entrained in the brake fluid. The bleeder screw then is tightened to seal the system. However, sometimes entrained air in the fluid reservoir may enter the master cylinder and be introduced into the path from the piston in the brake lever assembly to the piston(s) in the caliper, thereby degrading braking performance.

SUMMARY OF THE INVENTION

The present invention is directed to various features of a bicycle brake device. In one embodiment, a reservoir apparatus for a bicycle brake lever device comprises a master cylinder and a fluid reservoir including first and second reservoirs. The master cylinder has a master cylinder chamber dimensioned for receiving a master cylinder piston therein. The first reservoir has a first reservoir chamber in fluid communication with the master cylinder chamber for supplying a hydraulic fluid to the master cylinder chamber. At least a portion of the first reservoir chamber is disposed below a portion of the master cylinder chamber. The second reservoir has a second reservoir chamber in fluid communication with the first reservoir chamber, wherein the second reservoir chamber includes an air entrainment surface. The air entrainment surface is positioned higher than an upper surface of the first reservoir chamber. Additional inventive features will become apparent from the description below, and such features alone or in combination with the above features may form the basis of further inventions as recited in the claims and their equivalents.

BRIEF DESCRIPTION OF THE DRAWINGS

FIG. 1 is a schematic view of a bicycle brake system;

FIG. 2 is a bottom view of a reservoir assembly with the bottom cover removed; and FIG. 3 is a front cutaway view of the reservoir assembly.

DETAILED DESCRIPTION OF THE EMBODIMENTS

FIG. 1 is a schematic view of a bicycle brake system 10. Bicycle brake system 10 includes a brake lever assembly 14, a caliper assembly 18, and a brake fluid tube 19 connected between brake lever assembly 14 and caliper assembly 18. Caliper assembly 18 may be a conventional caliper assembly comprising a caliper housing 20 that supports a pair of oppositely facing brake pads 22 that frictionally contact a rotor 24 in response to hydraulic pressure applied to one or more pistons (not shown). A fluid reservoir (not shown) is disposed within caliper housing 20, and a bleeding screw 25 is screwed into caliper housing 20 for bleeding a fluid such as air and/or brake fluid from the fluid reservoir.

Brake lever assembly 14 includes a brake lever mounting assembly 26 and a brake lever 30. Brake lever mounting assembly 26 includes a handlebar mount 34 defining a handlebar mounting axis HM, a fluid reservoir 38, and a master cylinder 42. In this embodiment, both reservoir assembly 38 and master cylinder 42 are disposed entirely below handlebar mounting axis HM to provide a compact structure. As used herein, terms such as "upper," "below," etc. are determined from the orientation shown in FIG. 1, which also corresponds to a configuration wherein brake lever assembly 14 is mounted to handlebar H with brake lever 30 located in front of handlebar H. Handlebar mount 34 has a conventional structure that wraps around a handlebar H and is tightened in a conventional manner by a screw (not shown) that is screwed into aligned openings 46 in mounting ears 50.

Portions of brake lever mounting assembly 26, particularly the portions that connect brake lever 30 to reservoir assembly 38 and master cylinder 42, have been omitted to facilitate viewing. It should be sufficient to say that brake lever 30 is pivotably mounted relative to master cylinder 42 through a pivot shaft 54 defining a rotational axis R so that brake lever 30 rotates around axis R within a plane P toward and away from handlebar H. Brake lever 30 includes a conventional piston interface structure 58 that interfaces with a shaft 63 of a master cylinder piston 65 for reciprocally moving master cylinder piston 65 along a movement axis M. Master cylinder piston 65 includes a conventional return spring (not shown) that biases master cylinder piston 65 outwardly (toward the left in FIG. 1).

Reservoir assembly 38 includes a cover 62, a first reservoir 66 (FIG. 2) having a first reservoir chamber 70, and a second reservoir 74 having a second reservoir chamber 78. First reservoir chamber 70 is in fluid communication with a master cylinder chamber 82 (FIG. 3) through a timing port 86 and a compensation port 90, both of which are formed in an upper surface 94 of first reservoir chamber 70. The functions of timing port 86 and compensation port 90 are well known and will not be described further. Fluid entering master cylinder chamber 82 is communicated to a fluid outlet 96 connected to brake fluid tube 19. As shown in FIG. 3, a vertical length L1 of first reservoir chamber 70 is less than a horizontal length H1 of first reservoir chamber 70; a vertical length L2 of second reservoir chamber 78 is greater than a horizontal length H2 of second reservoir chamber 78; vertical length L1 of first reservoir chamber 70 is less than vertical length L2 of second reservoir chamber 78; and horizontal length H1 of first reservoir chamber 70 is greater than horizontal length H2 of second reservoir chamber 78. As a result, a junction between first reservoir 66 and second reservoir 74 forms a stepped surface 98.

The bottom surfaces of first reservoir chamber 70 and second reservoir chamber 78 are formed by cover 62 and are at the same vertical level. However, an upper surface 102 of second reservoir chamber 68 is positioned vertically higher than upper surface 94 of first reservoir chamber 70. As a result of the foregoing structure, first reservoir chamber 70 and ports 86 and 90 are disposed below master cylinder chamber 82 and movement axis M, master cylinder chamber 82 and movement axis M are disposed laterally adjacent to second reservoir chamber 78, and upper surface 102 is disposed above movement axis M and ports 86 and 90. Upper surface 102 functions as an air entrainment surface such that any air that enters reservoir assembly 38 will be urged towards second reservoir chamber 78 and upper surface 102. The entrained air will be trapped in second reservoir chamber 78 even during rough operation of the bicycle. As a result, timing port 86 and compensation port 90 will be continually immersed in brake fluid, no air will enter the path between master cylinder 42 and caliper housing 18, and firm and reliable brake operation will be maintained.

To install brake fluid into the above-described system, brake lever mounting assembly 26 is rotated around handlebar mounting axis HM until cover 62 is facing upwardly. Cover 62 is removed, brake fluid is installed into first reservoir chamber 70 and second reservoir chamber 78, bleeder screw 25 at caliper housing 20 is loosened, and brake lever 30 is operated to force brake fluid through master cylinder chamber 82, brake fluid tube 19 and the fluid reservoir in caliper housing 20 until brake fluid flows through bleeder screw 25 without air bubbles. Bleeder screw 25 then is tightened, cover 62 is reinstalled, and brake lever mounting assembly 26 is rotated around handlebar mounting axis HM until reservoir assembly 38 is disposed below handlebar H in the operating position.

Alternatively, once cover 62 is removed, bleeder screw 25 at caliper housing 20 may be loosened and brake fluid pumped through bleeder screw 25 until the brake fluid fills the reservoir chamber in caliper housing 20, flows through brake fluid tube 19 and fills first reservoir chamber 70 and second reservoir chamber 78. Thereafter, cover 62 is reinstalled, and brake lever mounting assembly 26 is rotated around handlebar mounting axis HM until reservoir assembly 38 is disposed below handlebar H in the operating position. In either case, once brake lever mounting assembly 26 is in the proper position, any air remaining in reservoir assembly 38 will migrate toward upper surface 102 in second reservoir chamber 78 and be entrained. As a result, air will not be allowed to enter the path between master cylinder 42 and caliper housing 18 as noted above.

While the above is a description of various embodiments of inventive features, further modifications may be employed without departing from the spirit and scope of the present invention. For example, a bleeder screw 220 may be added to second reservoir 74 in the embodiment shown in FIG. 1 so that brake fluid may be installed without removing cover 62. While upper surface 98 in the disclosed embodiment is generally flat and horizontal, the shape of upper surface 94 may vary. For example, upper surface 94 may be replaced by an inclined upper surface 230. The size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A brake lever apparatus for a bicycle comprising:
    a master cylinder having a master cylinder chamber;
    a master cylinder piston disposed for reciprocal motion within the master cylinder chamber;
    a brake lever for moving the master cylinder piston;
    a mounting assembly configured so that the brake lever may be mounted in front of a bicycle handlebar when the brake lever apparatus is mounted to the handlebar so that the brake lever is pulled rearwardly to operate the master cylinder piston for pressing against hydraulic fluid in the master cylinder chamber; and
    a fluid reservoir including:
        a first reservoir having a first reservoir chamber in fluid communication with the master cylinder chamber for supplying hydraulic fluid to the master cylinder chamber;
        wherein at least a portion of the first reservoir chamber is disposed below a portion of the master cylinder chamber when the brake lever apparatus is mounted to the handlebar such that the brake lever is mounted in front of the handlebar;
        wherein a surface below the master cylinder forms an upper surface of the first reservoir chamber;

a second reservoir having a second reservoir chamber in fluid communication with the first reservoir chamber;

wherein the second reservoir chamber includes an air entrainment surface; and wherein the air entrainment surface is positioned higher than the upper surface of the first reservoir chamber when the brake lever apparatus is mounted to the handlebar such that the brake lever is mounted in front of the handlebar; and wherein the master cylinder has a port in fluid communication with the first reservoir chamber, wherein the port faces a bottom surface of the fluid reservoir.

2. The apparatus according to claim 1 wherein the port is disposed substantially at a lowermost surface of the master cylinder when the apparatus is oriented so that the brake lever moves in a plane that is horizontal in front, rear, left, and right directions.

3. The apparatus according to claim 1 wherein the port comprises a timing port, and wherein the master cylinder has a compensation port in fluid communication with the first reservoir chamber, wherein the compensation port faces a bottom surface of the fluid reservoir.

4. A brake lever apparatus for a bicycle comprising:

a master cylinder having a master cylinder chamber;

a master cylinder piston disposed for reciprocal motion within the master cylinder chamber;

a brake lever for moving the master cylinder piston;

a mounting assembly configured so that the brake lever may be mounted in front of a bicycle handlebar when the brake lever apparatus is mounted to the handlebar so that the brake lever is pulled rearwardly to operate the master cylinder piston for pressing against hydraulic fluid in the master cylinder chamber; and only one fluid reservoir consisting of a first reservoir chamber and a second reservoir chamber;

wherein the first reservoir chamber is in fluid communication with the master cylinder chamber for supplying hydraulic fluid to the master cylinder chamber;

wherein a surface below the master cylinder forms an upper surface of the first reservoir chamber;

wherein the second reservoir chamber is in fluid communication with the first reservoir chamber;

wherein the second reservoir chamber includes an air entrainment surface; and wherein the entire upper surface of the first reservoir chamber is disposed below the air entrainment surface when the brake lever apparatus is mounted to the handlebar such that the brake lever is mounted in front of the handlebar to move in a plane that is horizontal in front, rear, left, and right directions.

5. The apparatus according to claim 4 wherein, when the brake lever apparatus is mounted to the handlebar such that the brake lever is mounted in front of the handlebar to move in a plane that is horizontal in front, rear, left, and right directions, a vertical length of the first reservoir chamber measured from an uppermost surface of the first reservoir chamber to a lowermost surface of the first reservoir chamber does not increase when measured progressively from a lowermost surface below the master cylinder that forms the upper surface of the first reservoir chamber to a side wall of the first reservoir chamber farthest from the second reservoir chamber.

* * * * *